United States Patent
Han et al.

(10) Patent No.: US 12,095,681 B2
(45) Date of Patent: Sep. 17, 2024

(54) RESOURCE ALLOCATION FOR CLIENTS OF MULTIPLE CO-HOSTED VAPS

(71) Applicant: Hewlett Packard Enterprise Development LP, Houston, TX (US)

(72) Inventors: Jianpo Han, Beijing (CN); Qiang Zhou, Sunnyvale, CA (US); Andre Beaudin, Montreal (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 470 days.

(21) Appl. No.: 17/487,680

(22) Filed: Sep. 28, 2021

(65) Prior Publication Data

US 2023/0095005 A1    Mar. 30, 2023

(51) Int. Cl.
*H04L 5/00*       (2006.01)
*H04W 28/02*      (2009.01)
*H04W 72/0446*    (2023.01)
*H04W 72/56*      (2023.01)

(52) U.S. Cl.
CPC ....... *H04L 5/0007* (2013.01); *H04W 28/0268* (2013.01); *H04W 72/0446* (2013.01); *H04W 72/56* (2023.01)

(58) Field of Classification Search
None
See application file for complete search history.

(56) References Cited

U.S. PATENT DOCUMENTS

| | | | |
|---|---|---|---|
| 10,237,891 B1 | 3/2019 | Chu et al. | |
| 10,462,816 B2 | 10/2019 | Patil et al. | |
| 10,602,430 B2 | 3/2020 | Chu et al. | |
| 2016/0081124 A1* | 3/2016 | Yang | H04W 48/20 370/329 |
| 2016/0119239 A1* | 4/2016 | Weitzman | H04W 16/04 370/230.1 |
| 2016/0366701 A1* | 12/2016 | Chu | H04W 74/004 |
| 2016/0374078 A1* | 12/2016 | Ghosh | H04W 12/03 |
| 2018/0199271 A1 | 7/2018 | Viger et al. | |
| 2018/0288695 A1* | 10/2018 | Tchigevsky | H04W 48/20 |
| 2018/0302923 A1* | 10/2018 | Patil | H04W 68/005 |

(Continued)

FOREIGN PATENT DOCUMENTS

| | | |
|---|---|---|
| GB | 2560562 | 9/2018 |
| WO | WO-20190166295 | 9/2019 |
| WO | WO-20200043433 | 3/2020 |

*Primary Examiner* — Brandon M Renner
(74) *Attorney, Agent, or Firm* — Hewlett Packard Enterprise Patent Department

(57) ABSTRACT

Implementations of the present disclosure relate to resource allocation for clients of multiple co-hosted virtual access points (VAPs). A method comprises determining, by an access point (AP), a plurality of trigger frames for a plurality of clients connected to a plurality of VAPs of the AP based at least in part on respective workload levels of the plurality of clients. A trigger frame indicates a resource unit of one of the plurality of VAPs available for at least one corresponding client to access to the VAP. The method also comprises transmitting, by the AP, the plurality of trigger frames in parallel to the plurality of clients. By transmitting separate trigger frames for different clients in parallel, the efficiency of trigger frames can be improved and higher quality of service and lower collision will be provided.

18 Claims, 7 Drawing Sheets

(56) References Cited

U.S. PATENT DOCUMENTS

| | | |
|---|---|---|
| 2019/0174577 A1 | 6/2019 | Patil et al. |
| 2019/0268892 A1 | 8/2019 | Gidvani et al. |
| 2020/0120711 A1* | 4/2020 | Sevin ..................... H04L 5/001 |
| 2021/0204324 A1* | 7/2021 | Viger ................ H04W 72/0446 |
| 2021/0410163 A1* | 12/2021 | Xia ....................... H04W 74/02 |
| 2023/0422314 A1* | 12/2023 | Viger ................... H04W 74/08 |

* cited by examiner

RESOURCE ALLOCATION FOR CLIENTS OF MULTIPLE CO-HOSTED VAPS

BACKGROUND

Wireless communication networks such as wireless local area network (ULAN) are capable to provide various communication services such as voice, video and messaging for multiple users (MU). In the wireless communication networks, a single access point (AP) may provide network connectivity to a plurality of clients or MU. The clients or MU may have access to the resources of the single AP through a plurality of Basic Service Sets (BSSs). As density increases in the wireless communication networks, allocating resources, assigning transmission power and scheduling uplink transmission to different clients become more complex and time-consuming. It is desired to enhance the efficiency of allocating and scheduling clients for the plurality of BSSs of the AP.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

As described above, in wireless communication networks, a single access point (AP) may provide network connectivity to a plurality of clients or MU through a plurality of BSSs. The term of BBS may also be referred to as a virtual AP (VAP) hereinafter. Example implementations of the present disclosure relate to allocating and scheduling clients for the plurality of VAPs of the AP.

Figure 1:
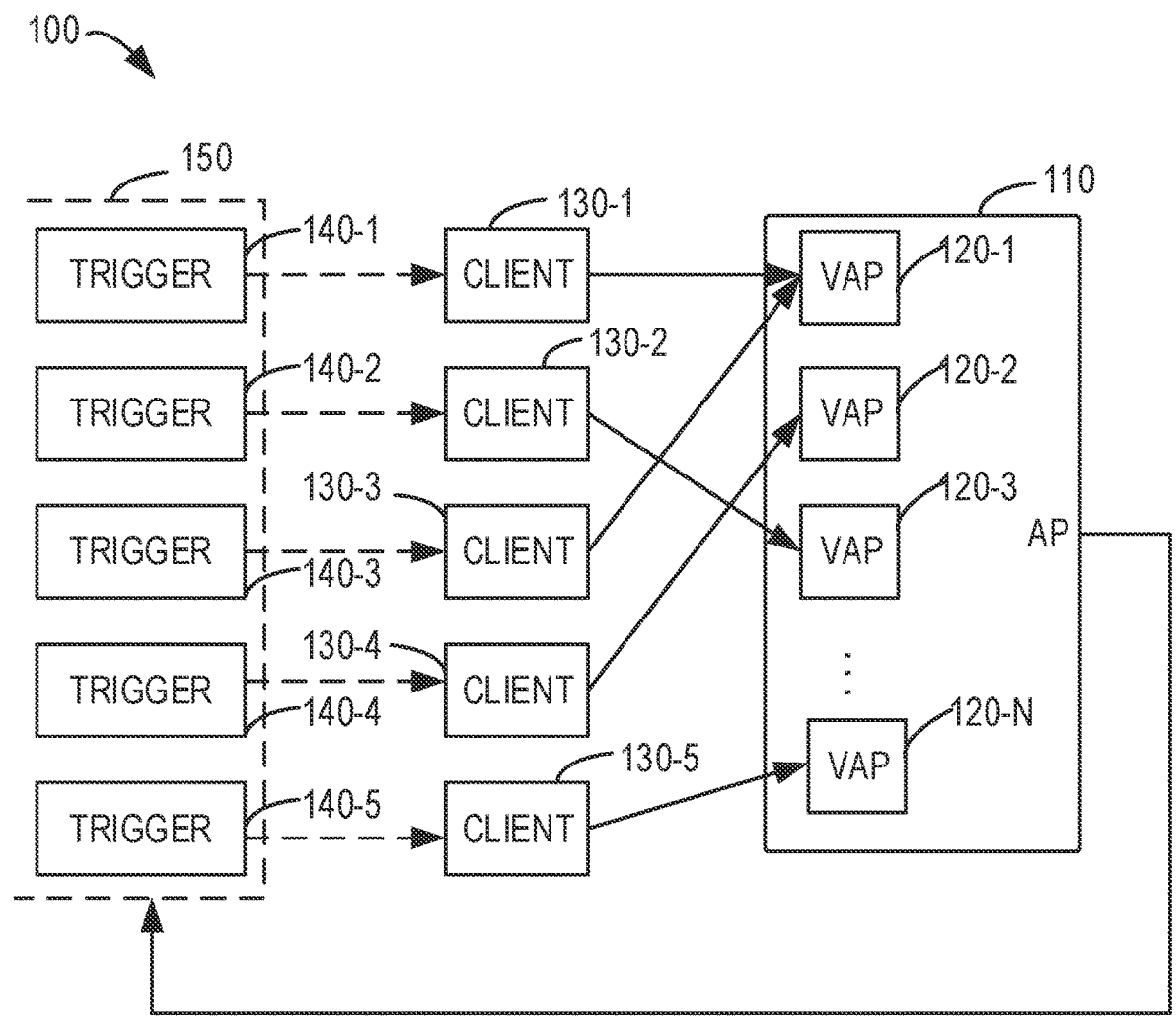
FIG. 1 illustrate a block diagram of an example communication environment in which example implementations of the present disclosure can be implemented.

FIG. 1 illustrates an example environment 100 in which example implementations of the present disclosure can be implemented. The example environment 100 may be implemented as a wireless communication network such as a WLAN. The example environment 100 includes an AP 110 and a plurality of clients including client 130-1, client 130-2, client 130-3, client 130-4 and client 130-5. The client 130-1, client 130-2, client 130-3, client 130-4 and client 130-5 may be collectively referred to as "clients 130" or individually referred to as a "client 130".

The client 130 may also be referred to as user device or station (STA). Examples of client 130 may include but not limited to a cell phone, tablet device, laptop computer or the like. The AP 110 may be any suitable device that allows one or more clients 130 to connect to the wireless communication network in the example environment 100. As used herein, an AP may comprise, be implemented as, or known as a Radio Router, Radio Transceiver, switch, Wi-Fi hotspot device, BSS, Extended Service Set (ESS), Radio Base Station (RBS), or some other terminology.

As shown in FIG. 1, the AP 110 may operate as a plurality of VAPs including VAP 120-1, VAP 120-2, VAP 120-3 and VAP 120-N. The VAP 120-1, VAP 120-2, VAP 120-3 and VAP 120-N may be collectively referred to as "VAPs 120" or individually referred to as a "VAP 120". The plurality of VAPs 120 may be referred to as multiple co-hosted VAPs. A plurality of clients 130 may be connected to the plurality of VAPs 120. For example, the clients 130-1 and 130-3 may be connected to the VAP 120-1, the client 130-2 may be connected to the VAP 120-3, the client 130-4 may connect to the VAP 120-2, and the client 130-5 may be connected to the VAP 120-N.

The AP 110 may provide communication connections for one or more clients 130 in the example environment 100 through the VAPs 120. In some example implementations, the example environment 100 may allow for single-user (SU) communications or multi-user (MU) communications between the AP 110 and the clients 130 through the VAPs 120. The example environment 100 may utilize a multiple channel access mechanism such as, for example, an orthogonal frequency-division multiple access (OFDMA) mechanism.

It is to be understood that the number of AP, VAP and clients is only for the purpose of illustration without suggesting any limitations. The example environment 100 may include any suitable number of AP, VAP and clients configured for implementing implementations of the present disclosure.

Communications in the example environment 100 may operate according to the wireless communication protocols such as Institute of Electrical and Electronic Engineers (IEEE) 802.11 standards, Wi-Fi Alliance Specifications), or any other wireless communication standards. The IEEE 802.11 standards may include the IEEE 802.11ax standard, or any other wireless communication standards.

A VAP 120 may be associated with a plurality of resource units (RUs). The term of "RU" used hereinafter refers to a unit in OFDMA terminology used in the wireless communication network to demote a group of bandwidth subcarriers used in transmission, for example a group of 78.125 kHz bandwidth subcarriers. A client 130 may have access to the VAP 120 through the RUs. For example, the client 130 may perform scheduled access or random access to the VAP 120 through the RU. In the case of performing scheduled access, a RU is scheduled for a specific client to access to a channel and transmit frame to the VAP 120, and may not be allowed for access by other client. In the case of performing random access using a RU, two or more clients may contend for the RU to access to a channel and transmit frame to the VAP.

In some example implementations, the AP 110 may transmit a combined trigger frame 150 to a plurality of clients 130. For example, the AP may transmit the combined trigger frame 150 to the plurality of clients 130 through an OFDMA transmission. The combined trigger frame 150 may include a trigger frame 140-1, a trigger frame 140-2, a trigger frame 140-3, a trigger frame 140-4 and a trigger frame 140-5. The trigger frame 140-1, the trigger frame 140-2, the trigger frame 140-3, the trigger frame 140-4 and the trigger frame 140-5 may be collectively referred to as "trigger frames 140" or individually referred to as a "trigger frame 140". The term of "trigger frame" may also be referred to as "trigger" for short. The trigger frame 140 may indicate that the client 130 may be assigned with a RU of the VAP 120 to perform access to the VAP 120. The trigger frame 140 may also indicate the type of the access to be performed by the client 130. For example, the trigger frame may indicate a random access or a scheduled access to be performed by the client 130.

In the illustrated example of FIG. 1, the trigger frame 140-1 may indicate that the client 130-1 is assigned with a RU of VAP 120-1 to perform access, such as random access or scheduled access to the VAP 120-1. The trigger frame 140-2 may indicate that the client 130-2 is assigned with a RU of VAP 120-3 to perform access such as random access or scheduled access to the VAP 120-3, for example. The trigger frame 140-3 may indicate that the client 130-3 is assigned with a RU of VAP 120-1 to perform access such as random access or scheduled access to the VAP 120-1. The trigger frame 140-4 may indicate that the client 130-4 is assigned with a RU of VAP 120-2 to perform access such as random access or scheduled access to the VAP 120-2. The trigger frame 140-5 may indicate that the client 130-5 is assigned with a RU of VAP 120-N to perform access such as random access or scheduled access to the VAP 120-N. That is, separate trigger frames indicating different types of access and different RUs of different VAPs will be transmitted to the clients 130 in parallel.

A VAP 120 may have a medium access control (MAC) address which may be used as a specific BSS identification (ID) (BSSID) for a group of clients having access to the VAP 120. For example, as shown in FIG. 1, the client 130-1 and the client 130-3 are associated with the VAP 120-1, and the trigger frame 140-1 and the trigger frame 140-3 may include the MAC address of the VAP 120-1. The client 130-2 is associated with the VAP 120-3, and the trigger frame 140-2 may include the MAC address of the VAP 120-2. In addition, an association identifier (AID) may be maintained by each VAP 120. Clients 130 associated with the VAP 120 may have duplicate AID. The VAP 120 may identify the AID for the group of clients 130 associated with a BBS and provide the AID to the group of clients 130.

For an AP in a wireless communication network, multiple VAPs are normally created on the same radio. Clients may connect to different VAPs. Each VAP has a unique MAC address such as the BSSID. Conventionally, OFDMA transmission can be supported on clients connected to the same VAP. The number of clients connected to the same VAP is relatively small with respect to the total number of clients in the wireless communication network, With the number of clients and the traffic increased, the number of OFDMA transmissions will be increased, and thus the OFDMA efficiency is not high. Thus, enabling OFDMA transmission among multi-VAPs will obviously bring OFDMA gains. In addition, conventionally, an AP will send a trigger frame including a set of random access parameters to a group of clients connected to a same VAP. The group of clients will contend for access to a random RU of a VAP based on the set of random access parameters. Different clients connected to the VAP would not receive separate trigger frames. In this case, for those clients with a larger workload, this kind of contention for access to a RU will prevent the larger workload from being transmitted. Therefore, it is desired to enhance the efficiency of allocating and scheduling clients for the plurality of VAPs of the AP.

Various example implementations of the present disclosure propose a more efficient way to allocate and schedule clients for the plurality of VAPs based on workload levels of the clients. Specifically, the clients in the wireless communication network may have different workload levels. For example one client may have a lot of pending traffic to be transmitted, while another client may have little traffic to be transmitted. The AP can determine a plurality of trigger frames for a plurality of clients at least based on the respective workload levels of the plurality of clients. Each trigger frame may indicate a RU of a corresponding VAP available for at the corresponding client to access. The AP transmits the plurality of trigger frames to the plurality of clients in parallel. In some example implementations, the AP may combine the plurality of trigger frames into an OFDMA frame, and transmit the OFDMA frame to the plurality of clients.

Through the parallel transmission of the plurality of trigger frames to the plurality of clients associated with the plurality of VAPs, the trigger frame efficiency such as the OFDMA efficiency can be enhanced. Moreover, by separate trigger frames for different clients associated with a same VAP, it can support separate random access RUs for different client groups, which can further provide better quality of service (QoS) and lower collision probability.

Some example implementations of the present disclosure will be discussed in detail below with reference to other figures.

Figure 2:
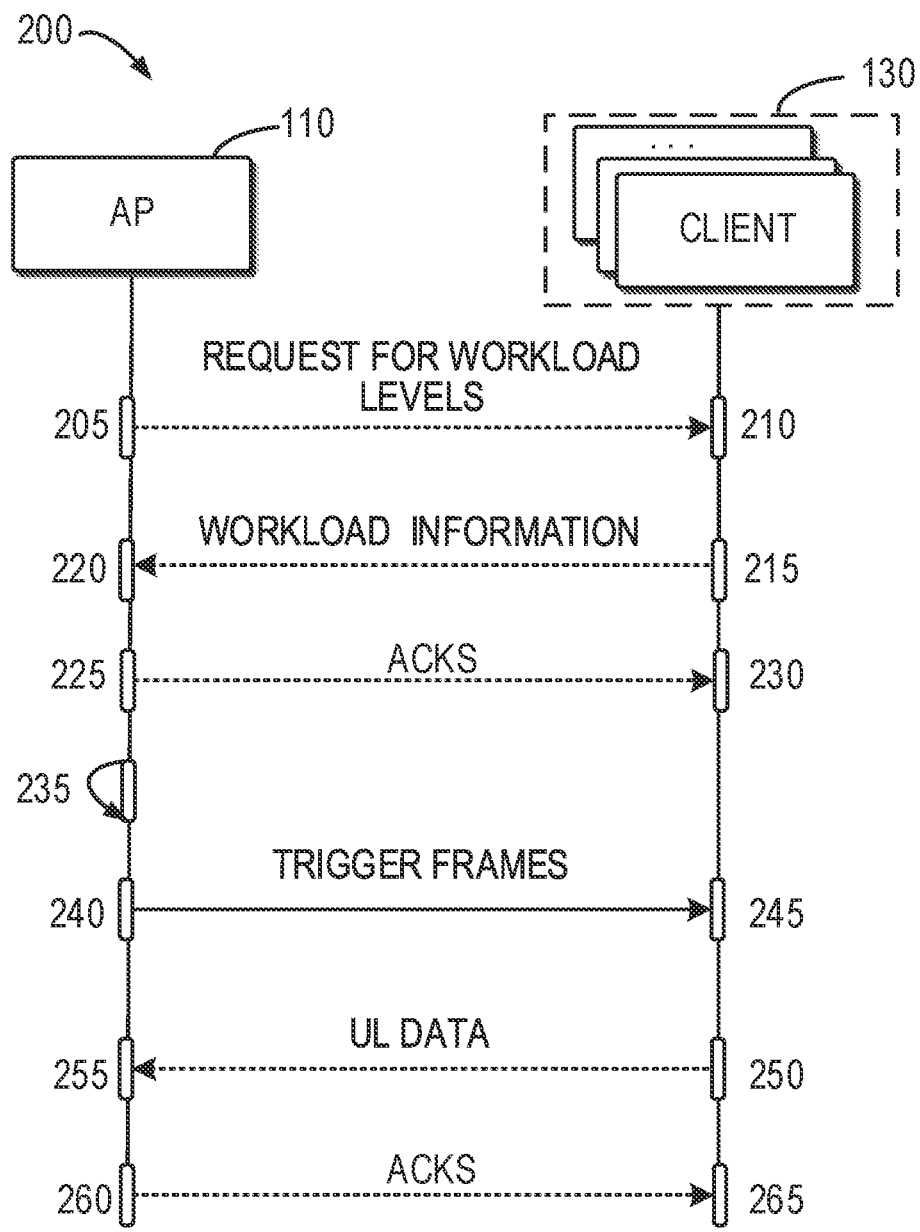
FIG. 2 illustrates a signaling flow for allocating resource units (RUs) for the clients in accordance with some example implementations of the present disclosure.

FIG. 2 illustrates a signaling flow 200 for RU allocation of VAPs for clients in accordance with some example implementations of the present disclosure. For the purpose of discussion, the signaling flow 200 will be described with reference to FIG. 1, to discuss example implementations of the RU allocation between the AP 110 and a plurality of clients 130. The clients 130 may include those that are connected to the AP 110.

As briefly discussed above, the AP 110 determines trigger frames based on workload levels of the clients 130. There are a variety ways to determine the workload levels of the clients 130. In some implementations, the AP may request the clients 130 to report their workload level. Specifically, in the signaling flow 200, the AP 110 may transmit 205 a request for a workload level of the client 130. In some implementations, the AP 110 may transmit a plurality of requests for workload levels of a plurality of clients 130 in parallel. Alternatively, the AP 110 may transmit a plurality of requests for workload levels of the plurality of clients separately and at different times.

Figure 3:
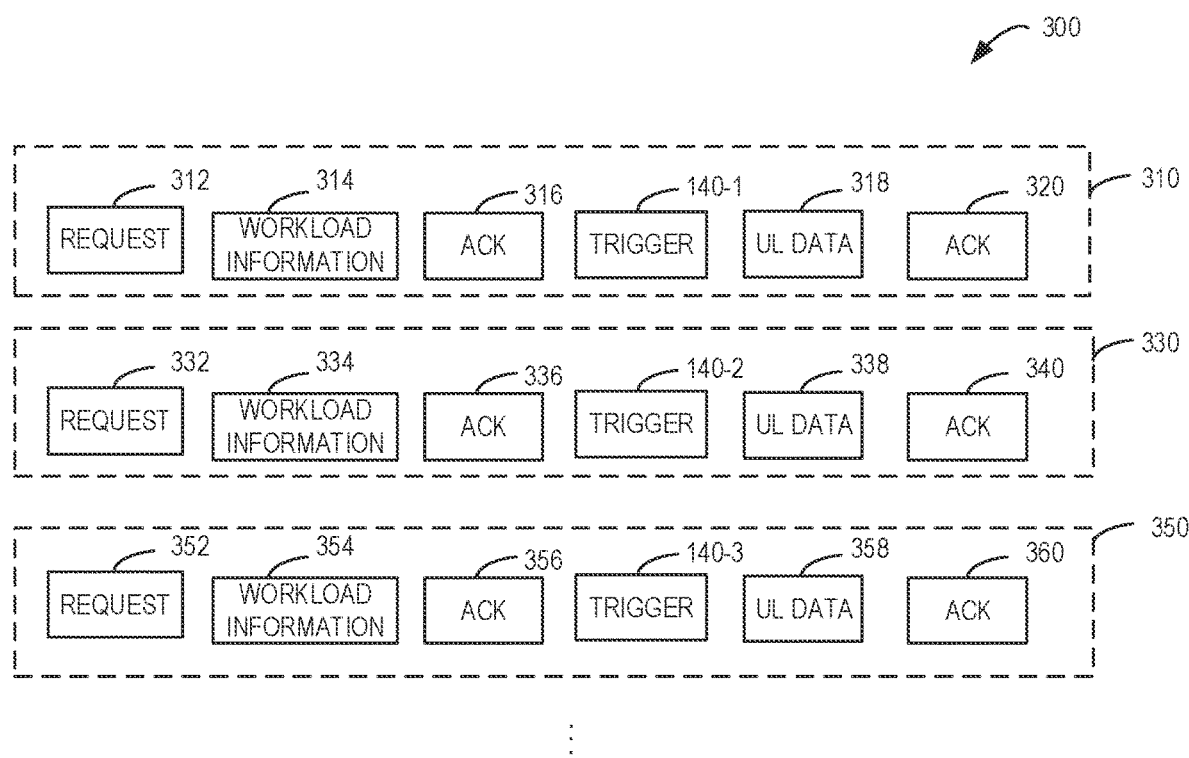
FIG. 3 illustrates example frame sequences for clients in accordance with some example implementations of the present disclosure.

FIG. 3 illustrates example frame sequences for clients in accordance with some example implementations of the present disclosure. In FIG. 3, for the purpose of brevity, frame sequences 310, 330 and 350 for the clients 130-1, 130-2 and 130-3 are specifically illustrated and frame sequences for other clients (if any) may be similar. The frame sequences 310, 330, and 350 may respectively include requests 312, 332 and 352 for the workload levels of the clients 130-1, 130-2 and the client 130-3. For example, each of the requests 312, 332 and 352 may comprise a trigger frame called buffer status report poll. The AP 110 may transmit the requests 312, 332 and 352 to the corresponding clients separately. Alternatively, the requests 312, 332 and 352 may be combined into an OFDMA frame. The AP 110 may transmit the combined OFDMA frame including the requests 312, 332 and 352 to the corresponding clients 130. It is to be understood that the number of frame sequences and the frames included therein may depend on the number of clients to which the AP is communicated.

The clients 130 receive 210 the request and then determine their workload levels. For example, a client 130 may determine its workload level by checking its buffer status. If there is a lot of pending traffic to be transmitted in its buffer, then the client 130 has a high workload level. Otherwise, for a client 130 with little traffic or even no pending traffic to be transmitted, its workload level may be low. Then, the clients 130 may transmit 215 their workload information to the AP 110.

For a client 130, the transmitted workload information may indicate the specific amount of pending traffic at the client 130 or may indicate one of a plurality of predetermined workload levels to which the amount of pending traffic is mapped. For the latter case, as a specific example, the predetermined workload levels may include a higher workload level, a middle workload level, and a low workload level. The client 130 may use two-bit information to indicate one of the three workload levels. It should be appreciated that the granularity of workload levels may be set according to applications and the scope of the present disclosure is not limited in this regard.

In the example of FIG. 3, the workload information 314, 334 and 354 respectively represent the workload information of the clients 130-1, 130-2 and 130-3. The workload information 314, 334 and 354 may be transmitted to the AP 110 separately or combined into an OFDMA frame and transmitted to the AP 110.

The AP 110 receives 220 the workload information and in some cases, may transmit 225 acknowledgements (ACKs) to the clients 130, to indicate that the workload information has been successfully received. For example, the AP 110 may transmit 225 the ACKs to the clients 130 separately.

Alternatively, in some implementations, the AP 110 may not transmit a request for the workload level of a client. Instead, the AP 110 may determine the workload level of that client 130 by analyzing historical traffic received from the client 130. For example, if the historical traffic of the client 130 is always at a high level, then the AP 110 may estimate that further traffic from this client will also be at a high level and thus may determine the workload level of this client is high. Otherwise, if a client 130 has a low historical workload level or is even in an idle status, the workload level of this client 130 may be determined as at a middle or low level.

After the AP 110 receives 220 the workload information for the clients 130 or otherwise determines the workload information for the clients 130, the AP 110 determines 235 a plurality of trigger frames for the clients 130 based on the workload levels of those clients 130. The respective trigger frame for the client 130 indicates a RU of a VAP 120 available for the client 130 to access to the VAP. For example, the trigger frame may include an address of a transmitter (TA) representing the address of VAP 120 (for example, the MAC address, or the BSSID), and an indication indicating a specific RU of the VAP 120, and an address of a receiver (RA) representing the address of the client 130.

In some example implementations, if a workload level of a client 130 exceeds a threshold level, the AP 110 may determine 235 a unicast trigger frame for the client 130. This unicast trigger frame may indicate a dedicated RU of a VAP 120 for the client 130 to perform scheduled access to the VAP 120. In the case of performing scheduled access, a RU is scheduled for a specific client to get access to the VAP and may not be allowed for access by other client. In some example implementations, the threshold level is predefined or preconfigured. In addition or alternatively, the threshold level may be dynamically adjusted during the resource allocating process. For example, if the AP 110 determines that the collision of clients is getting severing, then the AP 110 may increase the threshold level.

Alternatively, if the workload level of the client 130 is below a threshold level, the AP 110 may determine 235 a trigger frame indicating a shared RU of a VAP 120 for the client 130 to perform random access to the VAP 120. In the case of performing random access using a RU, two or more clients may contend for the RU to get access to the VAP. This trigger frame may be a unicast trigger frame or a broadcast trigger frame. In some implementations, the AP 110 may determine the trigger frames based on the workload levels and additional information. Details in determining trigger frames based on the workload levels and additional information will be described with respect to FIGS. 4-5 later.

After determining 235 the trigger frames for the clients, the AP 110 transmits 240 the trigger frames to the clients 130 in parallel. As shown in FIG. 3, the trigger frames 140-1, 140-2 and 140-3 for the clients 130-1, 130-2 and 130-3 may be combined into an OFDMA frame. The AP 110 may transmit the combined OFDMA frame including the trigger frames 140-1, 140-2 and 140-3 to the plurality of clients 130. By transmitting the trigger frames 140 in parallel, the clients 130 of different VAPs 120 may be synchronized and scheduled to perform transmissions at the same time.

After the clients 130 receive 245 the trigger frames, the clients 130 may perform for example scheduled access or random access to corresponding VAPs 120. After the clients 130 successfully get access to the corresponding VAPs 120, the clients 130 may transmit 250 UL data to the AP 110. As shown in FIG. 3, tUL data 318, 338 and 358 respectively represent the UL data transmitted by the clients 130-1, 130-2 and 130-3. The clients 130-1, 130-2 and 130-3 may transmit the UL data 318, 338 and 358 to the AP 110 by using RUs of the corresponding VAPs. For example, the clients may use different RUs other then the RUs indicated by the trigger frames to access to the channel and transmit frames to the VAPs.

After the AP 110 receives 255 the UL data, the AP 110 may transmit 260 ACKs indicating that the UL data has been successfully received from the clients 130. For example, the AP 110 may transmit 260 the ACKs to the corresponding clients 130 separately. The clients 130 may receive 265 the ACKs from the AP 110 and acknowledges that the UL data has been successfully received.

By determining a separate trigger frame for the client 130 based on its workload level, it may allow for a more flexibility RU allocation for the client 130. This flexible RU allocation may reduce collision and then improve the QoS. In addition, by transmitting the trigger frames for different clients in parallel, it may improve the efficiency of RU allocation and potentially improve the efficiency of UL transmission.

Several example implementations have been discussed above with respect to FIGS. 2-3. Additional example implementations regarding a determination of separate trigger frames for clients based on workload levels and additional information will be described with respect to FIGS. 4-5 below.

Figure 4:
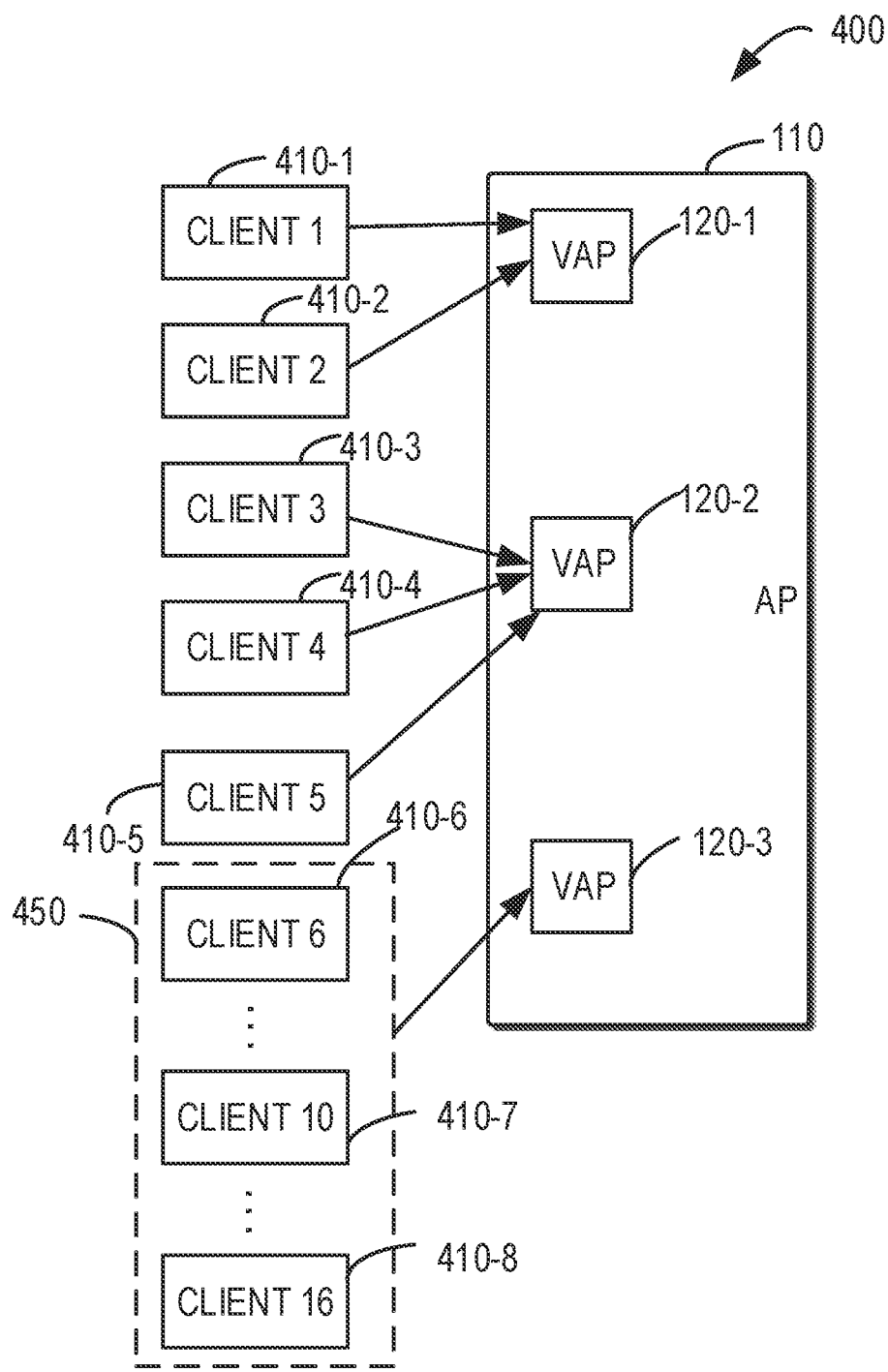
FIG. 4 illustrates an example RU allocation for clients in accordance with some example implementations of the present disclosure.

FIG. 4 illustrates an example RU allocation for clients in accordance with some example implementations of the present disclosure. In a wireless communication network 400, there is an AP 110 and a plurality of clients 410-1, 410-2, 410-3, 410-4, 410-5, 410-6, 410-7 and 410-8. The clients 410-1, 410-2, 410-3, 410-4, 410-5, 410-6, 410-7 and 410-8 may be collectively referred to as "clients 410" or individually referred to as a "client 410". For the purpose of illustration, the AP 110 includes VAP 120-1, VAP 120-2 and VAP 120-3. The plurality of clients 410 may be connected to the VAPs 120. For example, the clients 410-1 and 410-2 are connected to the VAP 120-1. The clients 410-3, 410-3 and 410-5 are connected to the VAP 120-2. The group 450 of clients including the clients 410-6, 410-7, 410-8 and potentially additional client are connected to the VAP 120-3.

It is to be understood that the number of APs, clients and VAPs in FIG. 4 is only for the purpose of illustration without suggesting any limitations. The communication network 400 may include any suitable number of AP, VAP and clients configured for implementing implementations of the present disclosure.

Figure 5:
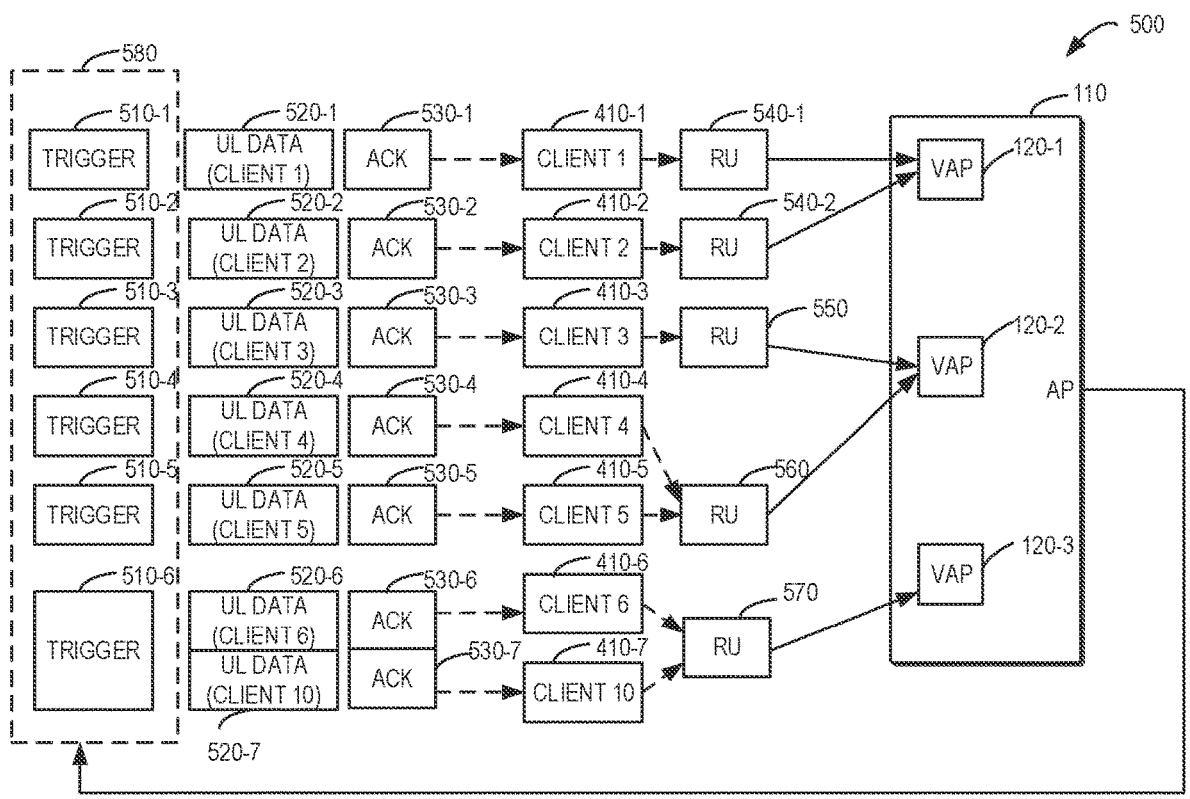
FIG. 5 illustrates an example uplink (UL) orthogonal frequency division multiple access (OFDMA) frame in accordance with some example implementations of the present disclosure.

FIG. 5 illustrates an example UL OFDMA frame transmitted by the AP 110 to the clients 410 in the wireless communication network 400. FIG. 4 and FIG. 5 will be described together to illustration more details regarding the determination of trigger frames based on the workload level and additional information for the clients.

As described above, if the workload level of a client exceeds a threshold level, the AP 110 may determine a unicast trigger frame for the client. In the examples of FIGS. 4-5, the work levels of the clients 410-1, 410-2 and 410-3 each exceed a threshold level. As such, the AP 110 may determine a unicast trigger frame 510-1 for the client 410-1 which indicates a scheduled RU 540-1 for the client 410-1 to perform scheduled access to the VAP 120-1. Similarly, the AP 110 may also determine a unicast trigger frame 510-2 for the client 410-2 and a unicast trigger frame 510-3 for the client 410-3, each indicating a scheduled RU 540-2 for the client 410-2 to perform scheduled access to the VAP 120-1 and a scheduled RU 550 for the client 410-3 to perform scheduled access to the VAP 120-2. It is to be understood that although three clients with scheduled access are specifically illustrated in FIGS. 4-5, there may have any suitable number of clients which are allocated with RUs for the scheduled access.

By doing so, the client 410-1, the client 410-2 and the client 410-3 may be assigned with a scheduled RU, thus avoid performing contention with other clients. Thus, clients with higher workload level may use scheduled RUs to get access to the VAPs, thus those clients would have more chance to successfully access to the channel and transmit frame to the VAPs. For example, after receiving the unicast trigger frames 410-1, 410-2 and 410-3, the clients 410-1, 410-2 and 410-3 may respectively use the RUs 540-1, 540-2 and 550 to get access to the VAPs 120-1 and 120-2. After getting access to the VAPs 120-1 and 120-2, the clients 410-1 and 410-2 may transmit UL data 520-1 and 520-2 to the AP 110 by using a RU of the VAP 120-1, and the client 410-3 may transmit UL data 520-3 to the AP 110 by using a RU of the VAP 120-2. The AP 110 may transmit the ACKs 530-1, 530-2 and 530-3 to the clients 410-1, 410-2 and 410-3 respectively, indicating that the UL data 520-1, 520-2 and 520-3 respectively successfully received.

In some example implementations, if the respective workload levels of a group of clients are below a threshold level, the AP 110 may determine at least one trigger frame for the group of clients further based on at least one of: respective probabilities of the group of clients performing a transmission within a time period, or respective priorities of transmissions performed by the group of clients.

For example, in FIGS. 4-5, the respective workload levels of the clients 410-4, 410-5, 410-6, 410-7 and 410-8 are each below the threshold level. If the respective probabilities of the clients 410-4 and 410-5 performing a transmission within a time period exceed a threshold probability, the AP 110 may determine a unicast trigger frame 510-4 for the client 410-4 and a unicast trigger frame 510-5 for the client 410-5. For example, the AP 110 may analyze the historical traffic of client 410-4 which shows that the client 410-4 may for example perform a transmission every 0.5 second, then the AP 110 determines that the probability of the client 410-4 performing a transmission within a time period such as 1 second exceed a threshold probability. In this case, the AP 110 may determine a unicast trigger frame 510-4 for the client 410-4. It is to be understood that above mentioned time period such as 0.5 second and 1 second is only for the purpose of illustration without suggesting any limitations.

In another example, the AP 110 may analyze the historical traffic of the client 410-5 which shows that the client 410-5 has many voice transmissions which may require a higher QoS or may have a higher priority. In this case, the AP 110 may determine a unicast trigger frame 510-5 for the client 410-5. As shown in FIG. 5, the client 410-4 and the client 410-5 may both perform random access to the VAP 120-2 through the RU 560. The information of clients sharing the RU 560, for example the information of clients 410-4 and 410-5 may be contained in a user list for the RU 560. The clients 410-4 and 410-5 may contend for the RU 560 to access to a channel and transmit frame to the VAP 120-2. After getting access to the VAP 120-2, the client 410-4 or 410-5 may transmit UL data 520-4 or 520-5 to the AP 110 by using a RU of VAP 120-2. For example, the client 410-4 or 410-5 may transmit the UL data 520-4 or 520-5 by using a RU other than RU 560 of the VAP 120-2. After receiving the UL data 520-4 from the client 410-4 or the UL data 520-5 from the client 410-5, the AP 110 may transmit the ACK 530-4 to the client 410-4 or the ACK 530-5 to the client 410-5, indicating that the UL data 520-4 or the UL data 520-5 respectively successfully received. Although FIG. 5 shows two clients performing random access to the RU 560, there may be possible more clients performing random access to the RU 560.

In some example implementations, if the AP 110 determines that respective probabilities of at least two clients of the clients with lower workload levels are below the threshold probability or that respective priorities of the at least two clients are below the threshold priority, then the AP 110 may determining a trigger frame for the at least two clients. The trigger frame may indicates a shared RU for the at least two clients to perform random access to the VAP. If a group of clients associated with a VAP for example a group of clients within a BSS, each has a lower probability or a lower priority, then the AP 110 may determine a broadcast trigger for the group of clients indicating a shared RU for the group of clients to perform random access to the VAP.

For example, the AP 110 may analyze the historical traffics of clients 410-6, 410-7 and 410-8 which show that the clients 410-6, 410-7 and 410-8 may for example perform a transmission every 2 seconds or even longer than 2 seconds, then the AP 110 determines that the probabilities of the clients 410-6, 410-7 and 410-8 performing a transmission within a time period such as 1 second are below a threshold probability. In this case, the AP 110 may determine a broadcast trigger frame 510-6 for the clients 410-6, 410-7 and 410-8. It is to be understood that the clients 410-6, 410-7 and 410-8 are specifically illustrated for the purpose of brevity, the AP 110 may determine a broadcast trigger frame for more or fewer clients, such as for a group of clients in a BSS associated with the VAP For example, the AP 110 may determine a broadcast trigger frame for 15 clients associated with a VAP. In this case, this broadcast trigger frame may be transmitted to 15 clients. Those 15 clients may contend for random access to a RU of the VAP. It is to be understood that above mentioned time period such as 2 seconds and 1 second, and the above mentioned 15 clients is only for the purpose of illustration without suggesting any limitations.

For another example, the AP 110 may analyze the historical traffic of clients 410-6, 410-7 and 410-8 which shows that the clients 410-6, 410-7 and 410-8 may for example perform video transmissions which may require a lower QoS or may have a lower priority. In this case, the AP 110 may determine a broadcast trigger frame 510-6 for the clients 410-6, 410-7 and 410-8.

Alternatively, if the clients 410-6, 410-7 and 410-8 support the multicast, then the AP 110 may determine a multicast trigger frame for the clients 410-6, 410-7 and 410-8. The trigger frame 510-6 indicates a shared RU 570 of the VAP 120-3 for the clients 410-6, 410-7 and 410-8 to perform random access to the VAP 120-3. Although FIGS. 4-5 only illustrate three clients sharing the trigger frame 510-6, there would be possible additional clients to share the trigger frame 510-6. The clients 410-6, 410-7 and 410-8 may contend for access to a channel and transmit frame to the VAP 120-3. After one of the client 410-6 or 410-7 or another client sharing the trigger frame 510-6 getting access to the VAP 120-3, this client which gets access to the VAP 120-3 may transmit corresponding UL data to the AP 110 by using a RU of the VAP 120-3. For example, if the client 410-6 successfully gets access to the VAP 120-3 by using the RU 560, the client 410-6 may transmit UL data 520-6 to the AP 110 by using a RU of the VAP 120-3. Similarly, if the client 410-7 successfully gets access to the VAP 120-3 by using the RU 560, the client 410-7 may transmit UL data 520-7 to the AP 110 by using a RU of the VAP 120-3.

After receiving the UL data 520-6 from the client 410-6 or the UL data 520-7 from the client 410-7 or another UL data (not shown) from another client sharing the trigger frame 510-6 for example the client 410-8, the AP 110 may transmit an ACK 530-6 to the client 410-6 or transmit an ACK 530-7 to the client 410-7 or transmit an ACK to another client such as the client 410-8, indicating that the UL data 520-6 or the UL data 520-7 or another UL data successfully received. By doing so, it may reduce the number of unicast trigger frames thus will save communication resources.

In some example implementations, the number of clients triggered by unicast trigger frames sharing the RU 560 to perform random access may be smaller than the number of clients trigger by a single broadcast or multicast trigger frame sharing the RU 570 to perform random access. By doing so, those clients with a relatively higher probability to perform transmission or with a higher QoS or priority will have more possibility to contend for a RU to access to a channel and transmit frame to the VAP. Thus the collision of traffic in the communication network will be reduced thus further improve the QoS and the performance of the communication network.

Also as shown in FIG. 5, the AP 110 may transmit the trigger frame 510-1, 510-2, 510-3, 510-4, 510-5 and 510-6 in parallel. For example, the AP 110 may combine the trigger frame 510-1, 510-2, 510-3, 510-4, 510-5 and 510-6 into an OFDMA frame 580 and transmit the OFDMA frame 580 to the clients 410. In addition or alternatively, the UL data 520-1, 520-2, 520-3, 520-4 or 520-5, 520-6 or 520-6 may be combined in an OFDMA frame and transmitted in parallel. By doing so, it can transmit several trigger frames in parallel which improve the efficiency of RU allocation and further improve the efficiency of transmission.

In some example implementations, one OFDMA frame may comprise a number of trigger frames not exceeding a predefined number such as 8 or 16. Thus, the AP 110 may divide the clients into some groups and combine the trigger frames in different groups of clients into different OFDMA frames and transmit these OFDMA frames one by one. In the case that one VAP has a large number of associated clients, the AP 110 may determine one single OFDMA frame for this VAP which may be referred to as single-VAP UL OFDMA. In the case that several VAPs have less number of clients, the AP may determine an OFDMA frame for these VAPs with less clients, which may be referred to as multiple-VAP UL OFDMA. By scheduling single-VAP UL OFDMA and multiple-VAPs UL OFDMA alternately, it may allocate resources for different clients associated with different VAPs more flexibly.

Several example implementations have been described with respect to FIGS. 2-5. Using the above described process, UL OFDMA is supported among multiple co-hosted VAPs, which will improve UL OFDMA efficiency. In addition, using separate random access RUs for different groups of clients can provide better QoS and lower collision probabilities.

Figure 6:
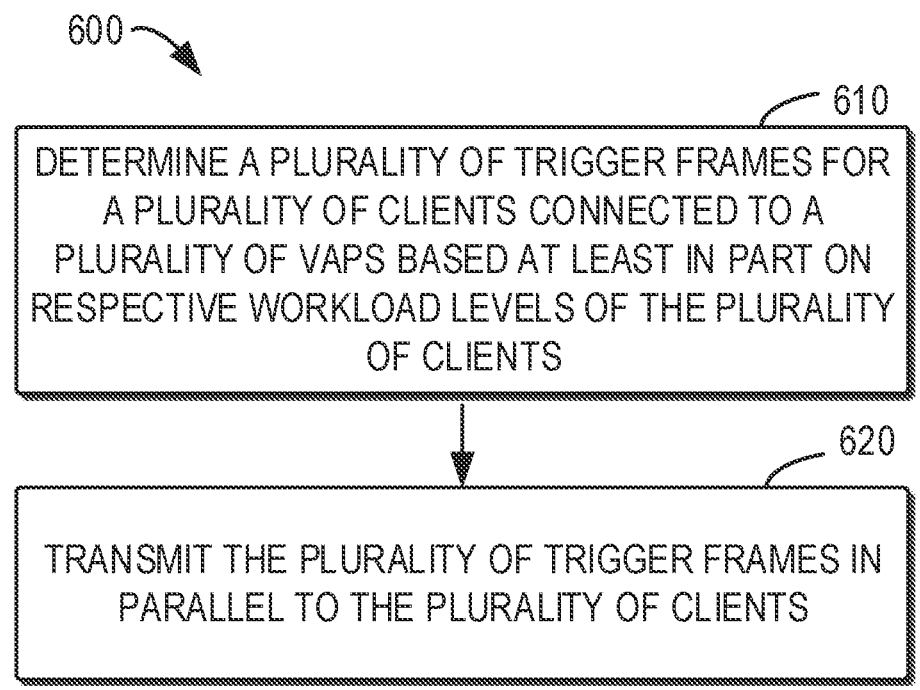
FIG. 6 illustrates a flowchart of a method in accordance with some example implementations of the present disclosure.

FIG. 6 illustrates a flowchart of a method 600 in accordance with some example implementations of the present disclosure. The method 600 can be carried out by the AP 110 according to the implementations described herein. While only some blocks are shown in the method 600, the method 600 may comprise other operations described herein.

At 610, the AP 110 determines a plurality of trigger frames for a plurality of clients connected to a plurality of VAPs of the AP 110 based at least in part on respective workload levels of the plurality of clients. A trigger frame indicates a RU of one of a plurality of VAPs available for at least one corresponding client to access to the VAP.

At 620, the AP 110 transmits the plurality of trigger frames in parallel to the plurality of clients. In some example implementations, in transmitting the plurality of trigger frames in parallel, the AP 110 may combine the plurality of trigger frames into an OFDMA frame; and transmit the OFDMA frame to the plurality of clients. In some example implementations; the plurality of trigger frames comprises at least one of the following: a unicast trigger frame for one of the plurality of clients, or a broadcast trigger frame for a group of clients among the plurality of clients In some example implementations, in determining the plurality of trigger frames for the plurality of clients, in accordance with a determination that a workload level of a first client of the plurality of clients exceeds a threshold level, the AP 110 may determine a unicast trigger frame for the first client, the unicast trigger frame indicating a dedicated resource unit of a first VAP of the plurality of VAPs available for the first client to perform scheduled access to the first VAP.

In some example implementations, in determining the plurality of trigger frames for the plurality of clients, in accordance with a determination that respective workload levels of a group of the plurality of clients are below a threshold level; the AP 110 may determine at least one trigger frame for the group of clients further based on at least one of: respective probabilities of the group of clients performing a transmission within a time period, or respective priorities of transmissions performed by the group of clients.

In some example implementations, in determining the at least one trigger frame for the group of clients, in accordance with at least one of a determination that a probability of a second client of the group of clients exceeds a threshold probability or a determination that a priority of the second client of the group of clients exceeds a threshold priority, the AP 110 may determine a first trigger frame for a second client, the first trigger frame indicating a first shared resource unit of a second VAP of the plurality of VAPs available for the second client to perform random access to the second VAP. In some example implementations, in determining the first trigger frame for the second client, the AP 110 may determine the first trigger frame to be a unicast trigger frame.

In some example implementations, in determining the at least one trigger frame for the group of clients, in accordance with at least one of a determination that respective probabilities of at least two clients in the group of clients are below the threshold probability or a determination that respective priorities of the at least two clients are below the threshold priority, the AP 110 may determine a second trigger frame for the at least two clients, the second trigger frame indicating a second shared resource unit of a third VAP of the plurality of VAPs available for the at least two clients to perform random access to the third VAP. In some example implementations, the number of clients sharing the first shared resource unit is smaller than the number of clients sharing the second shared resource unit. In some example implementations, in determining the second trigger frame for the subgroup of clients, the AP 110 may determine the second trigger frame to be a broadcast trigger frame.

Figure 7:
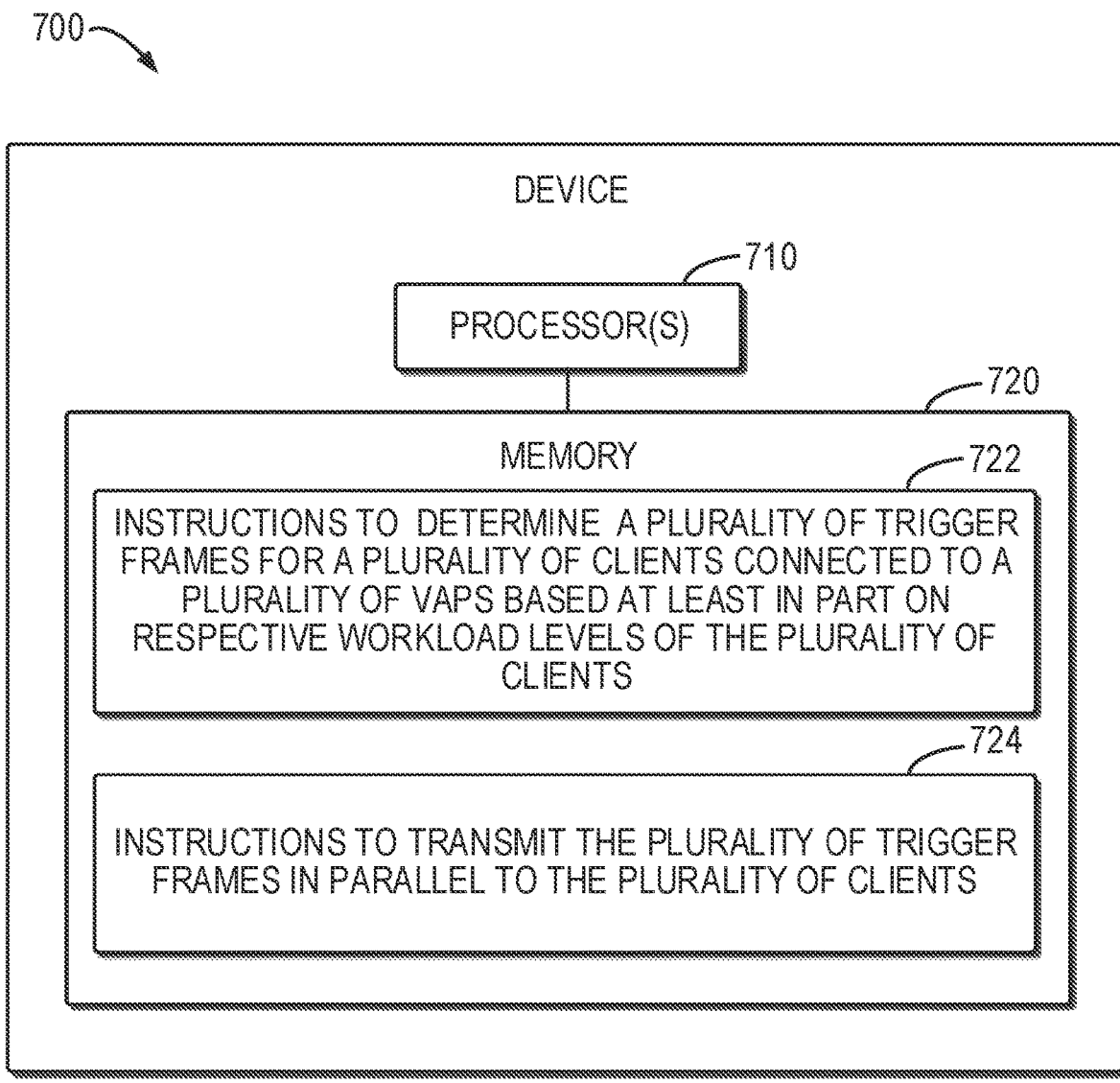
FIG. 7 illustrates a block diagram of a communication device in accordance with some example implementations of the present disclosure.

FIG. 7 illustrates a block diagram of an example device 700 in accordance with some example implementations of the present disclosure. The device 700 comprises at least one processor 710 and a memory 720 coupled to the at least one processor 710. The memory 720 stores instructions to cause the at least one processor 710 to implement acts of a method.

As illustrated in FIG. 7, the memory 720 stores instructions 722 to determine a plurality of trigger frames for a plurality of clients connected to a plurality of VAPs based at least in part on respective workload levels of the plurality of clients. A trigger frame indicates a RU of one of the plurality of VAPs available for at least one corresponding client to access to the VAP In some example implementations, the instructions 722 to determine the plurality of trigger frames for the plurality of clients comprises instructions to, in accordance with a determination that a workload level of a first client of the plurality of clients exceeds a threshold level, determine a unicast trigger frame for the first client, the unicast trigger frame indicating a dedicated resource unit of a first VAP of the plurality of VAPs available for the first client to perform scheduled access to the first VAP In some example implementations, the instructions 722 to determine the plurality of trigger frames for the plurality of clients comprises instructions to, in accordance with a determination that respective workload levels of a group of the plurality of clients are below a threshold level, determine at least one trigger frame for the group of clients further based on at least one of: respective probabilities of the group of clients performing a transmission within a time period, or respective priorities of transmissions performed by the group of clients.

In some example implementations, the instructions to determine the at least one trigger frame for the group of clients comprises instructions to, in accordance with at least one of a determination that a probability of a second client of the group of clients exceeds a threshold probability or a determination that a priority of the second client of the group of clients exceeds a threshold priority, determine a first trigger frame for a second client, the first trigger frame indicating a first shared resource unit of a second VAP of the plurality of VAPs available for the second client to perform random access to the second VAP. In some example implementations, the instructions to determine the first trigger frame for the second client comprises instructions to determine the first trigger frame to be a unicast trigger frame.

In some example implementations, the instructions to determine the at least one trigger frame for the group of clients comprises instructions to, in accordance with at least one of a determination that respective probabilities of at least two clients in the group of clients are below the threshold probability or a determination that respective priorities of the at least two clients are below the threshold priority, determine a second trigger frame for the at least two clients, the second trigger frame indicating a second shared resource unit of a third VAP of the plurality of VAPs available for the at least two clients to perform random access to the third VAP. In some example implementations, the number of clients sharing the first shared resource unit is smaller than the number of clients sharing the second shared resource unit. In some example implementations, the instructions to determine the second trigger frame for the subgroup of clients comprises instructions to determine the second trigger frame to be a broadcast trigger frame.

The memory 720 further stores instructions 724 to transmit the plurality of trigger frames in parallel to the plurality of clients. In some example implementations, the instructions 724 to transmit the plurality of trigger frames in parallel comprises instructions to combine the plurality of trigger frames into an OFDMA frame; and to transmit the OFDMA frame to the plurality of clients. In some example implementations, the plurality of trigger frames comprises at least one of the following: a unicast trigger frame for one of the plurality of clients, or a broadcast trigger frame for a group of clients among the plurality of clients The present disclosure also provides at least one computer program product tangibly stored on a non-transitory computer-readable storage medium. The computer program product includes program codes or instructions which can be executed to carry out the method as described above with reference to FIG. 6.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining, by an access point (AP), a plurality of trigger frames for a plurality of clients connected to a plurality of virtual APs (VAPs) of the AP based at least in part on respective workload levels of the plurality of clients, a trigger frame indicating a resource unit of one of the plurality of VAPs available for at least one corresponding client to access to the VAP, wherein determining the plurality of trigger frames for the plurality of clients comprises:
      in accordance with a determination that a workload level of a first client of the plurality of clients exceeds a threshold level, determining a unicast trigger frame for the first client, the unicast trigger frame indicating a dedicated resource unit of a first VAP of the plurality of VAPs available for the first client to perform scheduled access to the first VAP; and
   transmitting, by the AP, the plurality of trigger frames in parallel to the plurality of clients.

2. The method of claim 1, wherein the plurality of trigger frames comprises at least one of the following: a unicast trigger frame for one of the plurality of clients, or a broadcast trigger frame for a group of clients among the plurality of clients.

3. The method of claim 1, wherein determining the plurality of trigger frames for the plurality of clients comprises:
   in accordance with a determination that respective workload levels of a group of the plurality of clients are below a threshold level,
      determining at least one trigger frame for the group of clients further based on at least one of:
         respective probabilities of the group of clients performing a transmission within a time period, or
         respective priorities of transmissions performed by the group of clients.

4. The method of claim 3, wherein determining the at least one trigger frame for the group of clients comprises:
   in accordance with at least one of a determination that a probability of a second client of the group of clients exceeds a threshold probability or a determination that a priority of the second client of the group of clients exceeds a threshold priority,
      determining a first trigger frame for a second client, the first trigger frame indicating a first shared resource unit of a second VAP of the plurality of VAPs available for the second client to perform random access to the second VAP.

5. The method of claim 4, wherein determining the first trigger frame for the second client comprises:
   determining the first trigger frame to be a unicast trigger frame.

6. The method of claim 4, wherein determining the at least one trigger frame for the group of clients further comprises:
   in accordance with at least one of a determination that respective probabilities of at least two clients in the group of clients are below the threshold probability or a determination that respective priorities of the at least two clients are below the threshold priority,
      determining a second trigger frame for the at least two clients, the second trigger frame indicating a second shared resource unit of a third VAP of the plurality of VAPs available for the at least two clients to perform random access to the third VAP.

7. The method of claim 6, wherein the number of clients sharing the first shared resource unit is smaller than the number of clients sharing the second shared resource unit.

8. The method of claim 6, wherein determining the second trigger frame for the subgroup of clients comprises:
   determining the second trigger frame to be a broadcast trigger frame.

9. The method of claim 1, wherein transmitting the plurality of trigger frames in parallel to the plurality of clients comprises:
   combining the plurality of trigger frames into an orthogonal frequency division multiple access (OFDMA) frame; and
   transmitting the OFDMA frame to the plurality of clients.

10. A communication device comprising:
    at least one processor; and
    a memory coupled to the at least one processor, the memory storing instructions to cause the at least one processor to implement acts comprising:

determine a plurality of trigger frames for a plurality of clients connected to a plurality of virtual access points (VAPs) of the communication device based at least in part on respective workload levels of the plurality of clients, a trigger frame indicating a resource unit of one of the plurality of VAPs available for at least one corresponding client to access to the VAP, wherein determining the plurality of trigger frames for the plurality of clients comprises:

in accordance with a determination that respective workload levels of a group of the plurality of clients are below a threshold level, determining at least one trigger frame for the group of clients further based on at least one of:

respective probabilities of the group of clients performing a transmission within a time period, or respective priorities of transmissions performed by the group of clients; and transmit the plurality of trigger frames in parallel to the plurality of clients.

11. The communication device of claim 10, wherein determining the plurality of trigger frames for the plurality of clients comprises:

in accordance with a determination that a workload level of a first client of the plurality of clients exceeds a threshold level, determining a unicast trigger frame for the first client, the unicast trigger frame indicating a dedicated resource unit of a first VAP of the plurality of VAPs available for the first client to perform scheduled access to the first VAP.

12. The communication device of claim 10, wherein determining the at least one trigger frame for the group of clients comprises:

in accordance with at least one of a determination that a probability of a second client of the group of clients exceeds a threshold probability or a determination that a priority of the second client of the group of clients exceeds a threshold priority, determining a first trigger frame for a second client, the first trigger frame indicating a first shared resource unit of a second VAP of the plurality of VAPs available for the second client to perform random access to the second VAP.

13. The communication device of claim 12, wherein determining the first trigger frame for the second client comprises:

determining the first trigger frame to be a unicast trigger frame.

14. The communication device of claim 12, wherein determining the at least one trigger frame for the group of clients further comprises:

in accordance with at least one of a determination that respective probabilities of at least two clients in the group of clients are below the threshold probability or a determination that respective priorities of the at least two clients are below the threshold priority, determining a second trigger frame for the at least two clients, the second trigger frame indicating a second shared resource unit of a third VAP of the plurality of VAPs available for the at least two clients to perform random access to the third VAP.

15. The communication device of claim 14, wherein the number of clients sharing the first shared resource unit is smaller than the number of clients sharing the second shared resource unit.

16. The communication device of claim 14, wherein determining the second trigger frame for the subgroup of clients comprises:

determining the second trigger frame to be a broadcast trigger frame.

17. The communication device of claim 10, wherein transmitting the plurality of trigger frames in parallel to the plurality of clients comprises:

combining the plurality of trigger frames into an orthogonal frequency division multiple access (OFDMA) frame; and transmitting the OFDMA frame to the plurality of clients.

18. A non-transitory computer-readable medium comprising instructions stored thereon which, when executed by an apparatus, cause the apparatus to perform actions comprising:

determine a plurality of trigger frames for a plurality of clients connected to a plurality of virtual access points (VAPs) based at least in part on respective workload levels of the plurality of clients, a trigger frame indicating a resource unit of one of the plurality of VAPs available for at least one corresponding client to access to the VAP, wherein determining the plurality of trigger frames for the plurality of clients comprises:

in accordance with a determination that a workload level of a first client of the plurality of clients exceeds a threshold level, determining a unicast trigger frame for the first client, the unicast trigger frame indicating a dedicated resource unit of a first VAP of the plurality of VAPs available for the first client to perform scheduled access to the first VAP; and transmit the plurality of trigger frames in parallel to the plurality of clients.

* * * * *